H. W. ALDEN.
HITCH FOR TRACTORS.
APPLICATION FILED SEPT. 15, 1919.
1,374,271.
Patented Apr. 12, 1921.
3 SHEETS—SHEET 1.
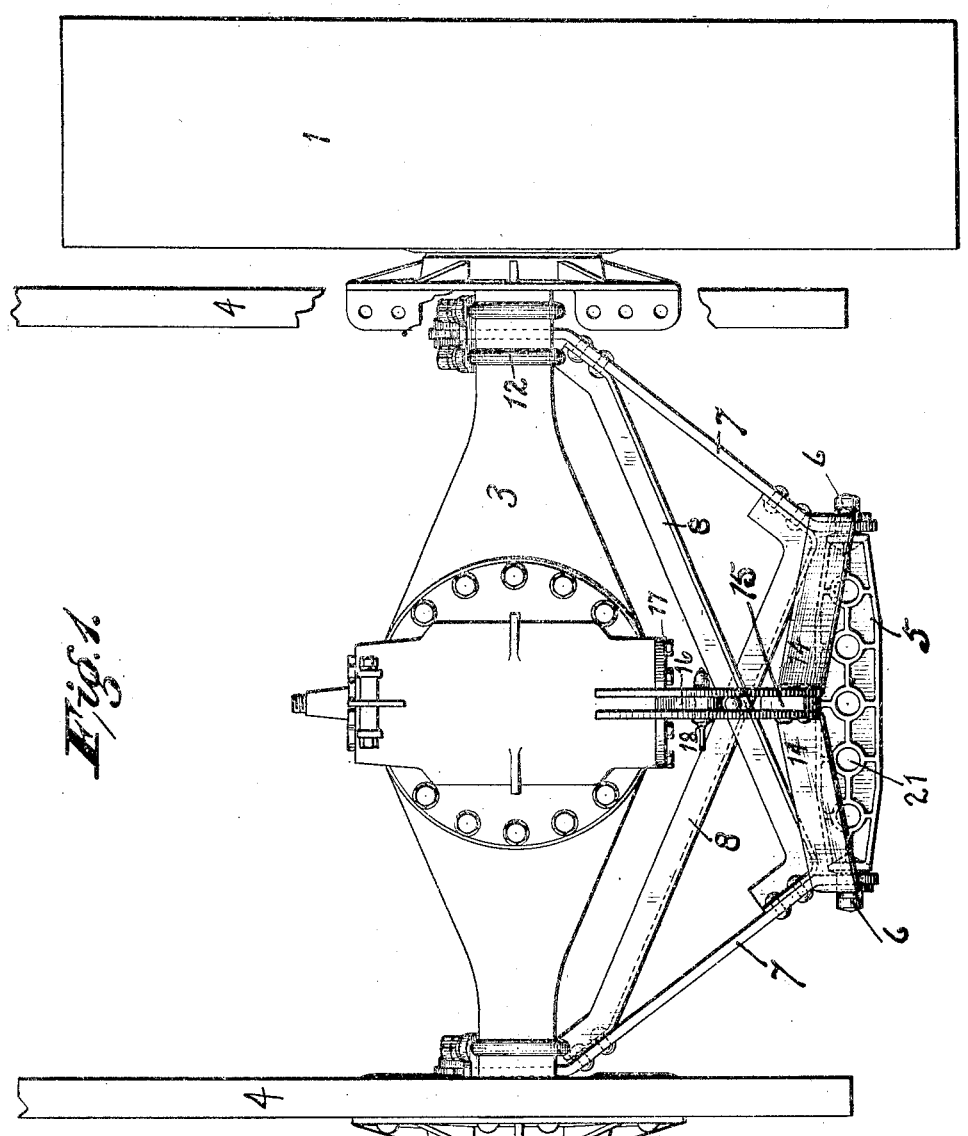
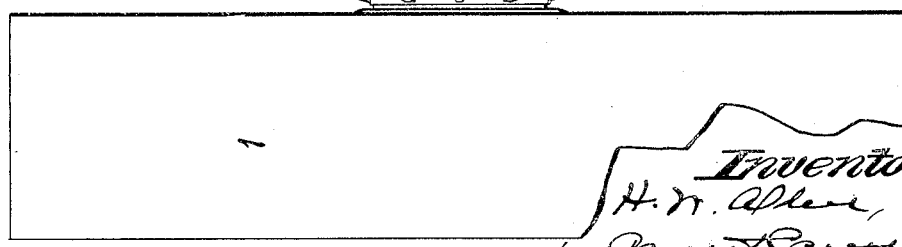

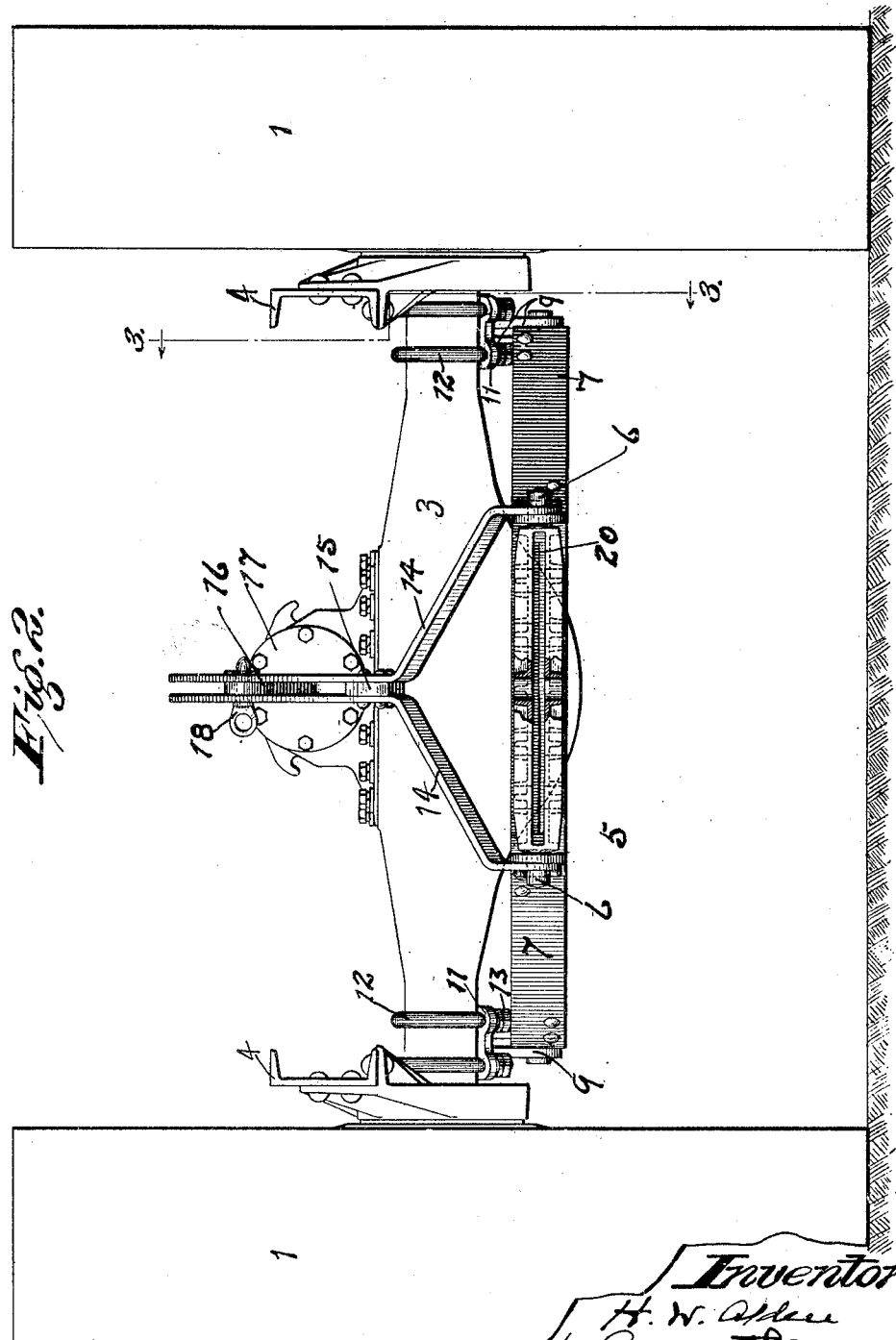

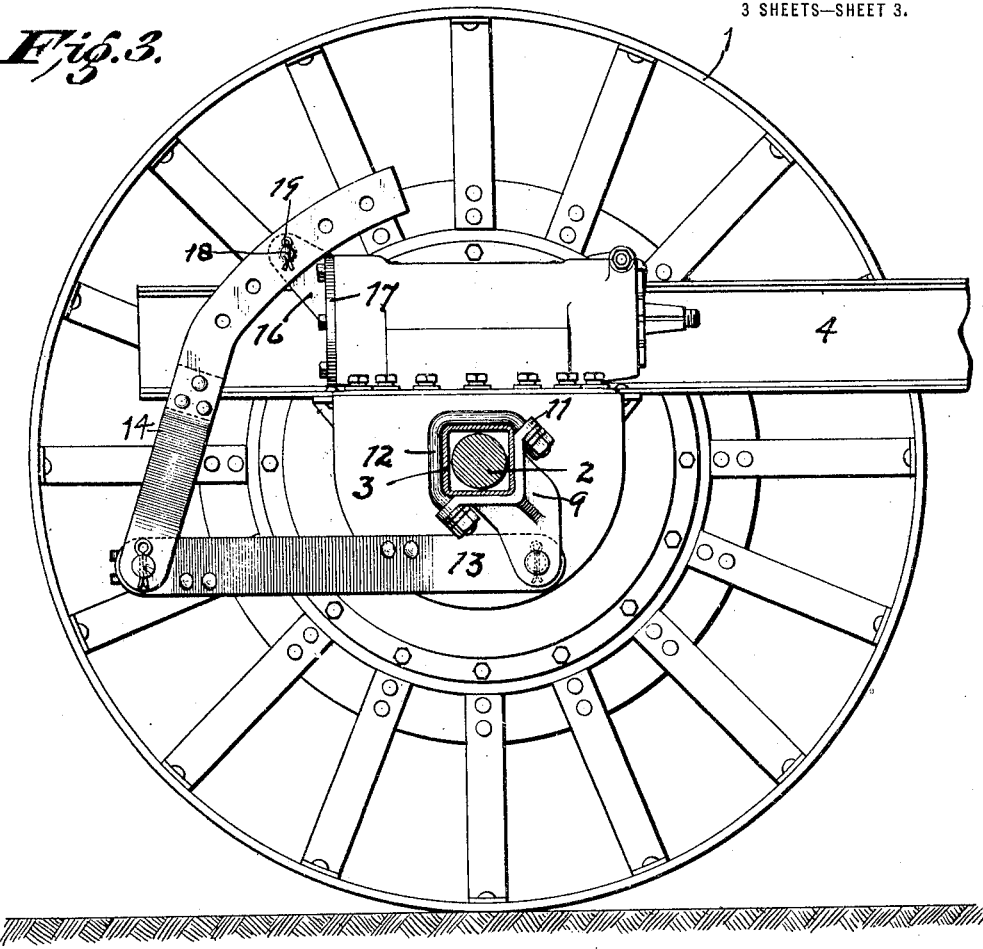

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

HITCH FOR TRACTORS.

1,374,271.      Specification of Letters Patent.      Patented Apr. 12, 1921.

Application filed September 15, 1919. Serial No. 323,833.

*To all whom it may concern:*

Be it known that I, HERBERT W. ALDEN, a citizen of the United States, and a resident of the city of Detroit, in the county of Wayne and State of Michigan, have invented a new and useful Improvement in Hitches for Tractors, of which the following is a specification.

My invention relates to means for hitching implements and trailers to vehicle axles, especially to tractor axles. The principal objects of the invention are to provide a hitch that can be readily mounted on and dismounted from the axle, that will take care of the draft stresses to the best advantage, that will provide for vertical adjustment of the hitch beam, that will provide for attachment and detachment of various implements at a plurality of laterally separated points, and that will embody other advantages hereinafter appearing. The invention consists in the combinations and arrangements of parts hereinafter described.

In the accompanying drawing wherein like numerals refer to like parts wherever they occur, Figure 1 is a plan view of my hitch applied to a tractor axle;

Fig. 2 is an end elevation with a portion of the hitch beam shown in section;

Fig. 3 is a side elevation of my device, with the axle shown in section on the line 3—3 in Fig. 2;

Fig. 4 is a view of the hitch frame looking from the front and showing at one end its connection to the axle;

Fig. 5 is a detail plan view of the end portion of the hitch beam, the left portion of said figure illustrating the lower portion of the beam;

Fig. 6 is a detail side view of the end portion of the hitch beam, the left-hand portion thereof being shown in section;

Fig. 7 is an end view of the hitch beam; and

Fig. 8 is a cross section of the hitch beam on the line 8—8 in Fig. 6.

The accompanying drawing illustrates tractor wheels 1, an axle shaft 2, a housing 3 for the driving shaft, and vehicle body frame members 4 rigidly secured to the axle housing.

My device comprises a hitch beam 5 whose ends are formed into trunnions 6 that are mounted in holes provided therefor in the rear end portions of heavy draft plates 7. Preferably, these end portions are parallel but the body portions of said draft plates 7 diverge outwardly and forwardly to points close to the respective traction wheels and thence extend forwardly substantially parallel with each other. The body portions of these main draft plates 7 are rigidly connected together by angle plates 8 that extend from the rear end of the body portion of one draft plate to the front end of the body portion of the other draft plate. The ends of these angle plates 8 are bent to lie flatwise against the draft plates 7 and are secured thereto preferably by riveting; and at their intersection, their flat sides are riveted together.

Mounted near each end of the axle housing 3 is a projecting bracket or arm 9 adapted for the attachment thereto of the front end of a draft plate 7. A convenient means of attachment consists in forming the projection 9 with a bifurcation with sufficient space between its arms to receive the end of the draft plate, the arms and draft plate being perforated in alinement to permit a headed pivot pin 10 to extend through them. The projecting end of the pin is perforated to receive a cotter or split pin $10^a$ or is otherwise provided with means for locking the pivot pin in place. By this arrangement, the draft plate is rotatably attached to the axle so that its rear or free end can move upwardly and downwardly within limits.

In the construction illustrated, the bracket serves to attach the draft plate to the axle housing and has its inner end formed into a rectangular or trough-shaped recess that conforms to the rectangular section of the housing and fits against two sides thereof, preferably the front and lower sides. The ends of said bracket are provided with perforated lugs 11, through which extend the threaded ends of U-bolts 12 that extend around the housing. Nuts 13 on said threaded ends clamp said bracket firmly against the housing.

By the arrangement described, the hitch is firmly secured to the axle housing close to the wheels; and as the draft members are rigidly framed together, the stress is distributed to the two ends of the axle. The pivotal attachment of the hitch to the axle housing permits the draft beam to be lifted and lowered at will. In order to hold the draft beam in its adjusted position, a supporting yoke is provided. This yoke comprises two plates 14, whose outer ends are substantially parallel and are provided with holes through which extend the trunnions of the draft beam. The inner ends of said yoke members are also substantially parallel, but are spaced apart by means of a narrow distance block 15 through which the two members are riveted together. The free ends of these yoke members lie on opposite sides of a projecting lug 16 provided for the purpose on the axle housing, preferably being cast integral with the head or end member 17 that serves to close the end of the housing for the drive worm. The upper or free ends of the supporting yoke have a series of perforations in alinement with each other, and said projecting lug also has a perforation. In order to hold the hitch in any adjusted position, it is only necessary to aline the holes in the free ends of the yoke 14 with the hole in the lug 16 on the housing and then pass a locking pin 18 therethrough. Preferably, the locking pin 18 is provided with a cotter 19 or other means for preventing its accidental displacement.

The draft beam is specially adapted for the attachment thereto of various implements and is designed to afford a considerable range laterally for the place of attachment. For these purposes, the body portion of the beam is formed with a longitudinal slot 20 extending almost to the ends thereof and of sufficient thickness to receive the ordinary clevises or other coupling devices with which wagon and farming implements are commonly equipped. The beam is provided with a series of holes 21 extending therethrough at right angles to said slot and of proper size to receive a coupling pin. In order to save weight, the upper and lower surfaces thereof are pitted or skeletonized as indicated in the drawing.

It is obvious from the foregoing description that my hitch is very simple in construction, that it is easy to attach to and detach from the axle housing, that it throws no undue stress into the axle housing, that it provides for a considerable vertical adjustment of the beam, and that it affords a considerable range of selection for the point of attachment of the working implement or trailer.

Obviously, the construction hereinbefore described admits of considerable variation without departing from the invention.

What I claim is:

1. The combination with an axle having brackets rigidly mounted thereon, of a hitch pivotally attached to said brackets to swing vertically, said hitch comprising side frame members, a draft beam supported thereby, and a suspending hanger therefor, said hanger being adjustably connected to the axle and adapted to be held in adjusted position to prevent vertical movement of said hitch.

2. A hitch for tractors and the like comprising a frame whose front ends are provided with brackets pivotally connected thereto and adapted for attachment to and detachment from the end portions of the axle of a tractor and whose rear portion comprises a beam provided with a longitudinal slot and with a plurality of holes disposed transversely with respect to said slot, the ends of said beams constituting trunnions therefor whereby said beam is rotatably mounted in said frame.

3. The combination with an axle which has non-circular portions near its ends, of brackets near the ends thereof whose bases fit an angle thereof and U-bolts for clamping said brackets to said axle, of a hitch for tillage implements extending rearwardly of said axle and comprising a frame pivotally connected to said brackets to swing up and down, and a draft beam on the free end of said frame.

4. The combination with an axle of polygonal section, of brackets whose bases fit a lower front angle thereof and whose projecting arms are bifurcated and are perforated transversely, and U-bolts for clamping said brackets to said axle, of a hitch extending rearwardly of said axle and comprising transversely perforated frame members extending into the bifurcations of said brackets, and pins extending through the perforations of said brackets and frame members for pivotally connecting them together and a draft beam on the rear of said frame.

5. The combination with an axle having brackets rigidly mounted thereon, of a hitch pivotally attached to said brackets to swing vertically, said hitch comprising frame members, a draft beam supported thereby, and a suspending hanger therefor adjustably connected to the axle, said draft beam having a longitudinal slot therethrough and a plurality of holes for coupling pins arranged transversely of said slot.

6. The combination with the driving axle of an automobile tractor or the like having brackets rigidly mounted on its end portions, of a hitch pivotally attached to said brackets to swing vertically, said hitch comprising draft plates cross-connected by intersecting members, a draft beam supported thereby, and a suspending hanger adjustably connected to the axle.

7. The combination with an axle having brackets rigidly mounted thereon, of a hitch pivotally attached to said brackets to swing vertically and coupling devices for the implements to be attached thereto, said hitch comprising frame members, a draft beam supported thereby, and a suspending hanger therefor adjustably connected to the axle, said draft beam being adapted at a plurality of points for coöperation with the implement coupling devices.

8. The combination with an axle of polygonal section, of brackets whose bases fit the lower front angle thereof and have bifurcated extensions projecting downwardly and forwardly, and U-bolts for clamping said brackets to said axle, of a hitch for tillage implements and the like comprising frame plates extending into the bifurcations, a draft beam on said frame plates substantially parallel with said axle, a suspension yoke for said hitch adjustably connected to the axle, and locking pins extending horizontally through holes provided therefor in said frame and said brackets for pivotally securing said hitch to said axle.

9. A hitch for tractors comprising a frame comprising plates whose inner and outer ends are substantially parallel and are perforated to permit pivotal movement upwardly and downwardly and whose body portions diverge outwardly, and brace members connecting the inner end of the body portion of each of said plates with the outer end of the body portion of the other plate, a beam mounted in the free ends of said plates, and means for holding said beam at divers elevations.

10. The combination with an axle having a laterally perforated projection thereon, of a hitch comprising a frame, a beam rotatably mounted thereon, and a suspension member connected to said frame and having a perforated portion adapted to straddle said projection and receive a locking pin for attaching them together.

Signed at Detroit, Michigan, this 10th day of September, 1919.

HERBERT W. ALDEN.